L. J. CORBIN.

Seed-Planter.

No. 8,089. Reissued Feb. 19, 1878.

*Attest.*

James Ferguson

A. O. Behel.

*Inventor.*

Lyman J. Corbin

N. PETERS, PHOTO-LITHOGRAPHER, WASHINGTON, D.C.

UNITED STATES PATENT OFFICE.

LYMAN J. CORBIN, OF WINNEBAGO, ILLINOIS.

IMPROVEMENT IN SEED-PLANTERS.

Specification forming part of Letters Patent No. 146,321, dated January 13, 1874; Reissue No. 8,089, dated February 19, 1878; application filed July 16, 1877.

*To all whom it may concern:*

Be it known that I, LYMAN J. CORBIN, of Winnebago, in the county of Winnebago and State of Illinois, have invented a new and useful Improvement in Seed-Planters; and I do hereby declare that the following is a full and exact description of the same, reference being had to the accompanying drawings, and to the letters of reference marked thereon.

Figure 1:
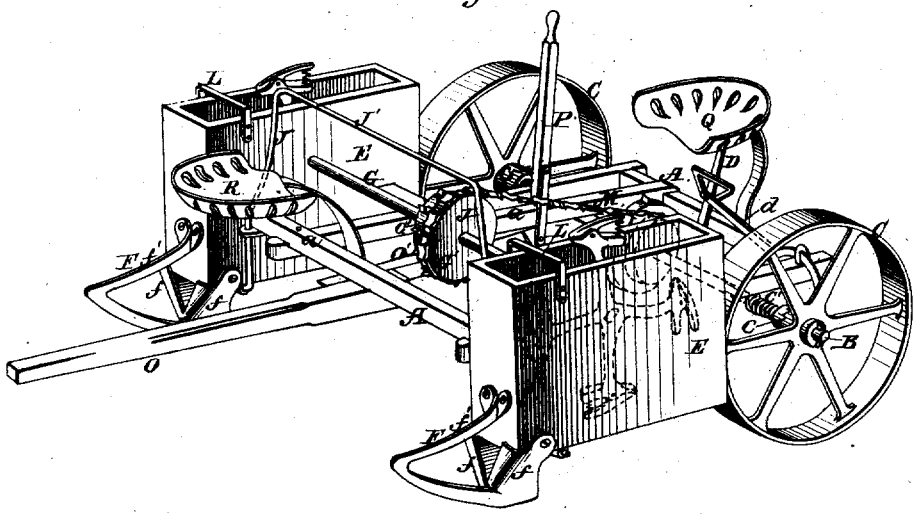
Figure 2:
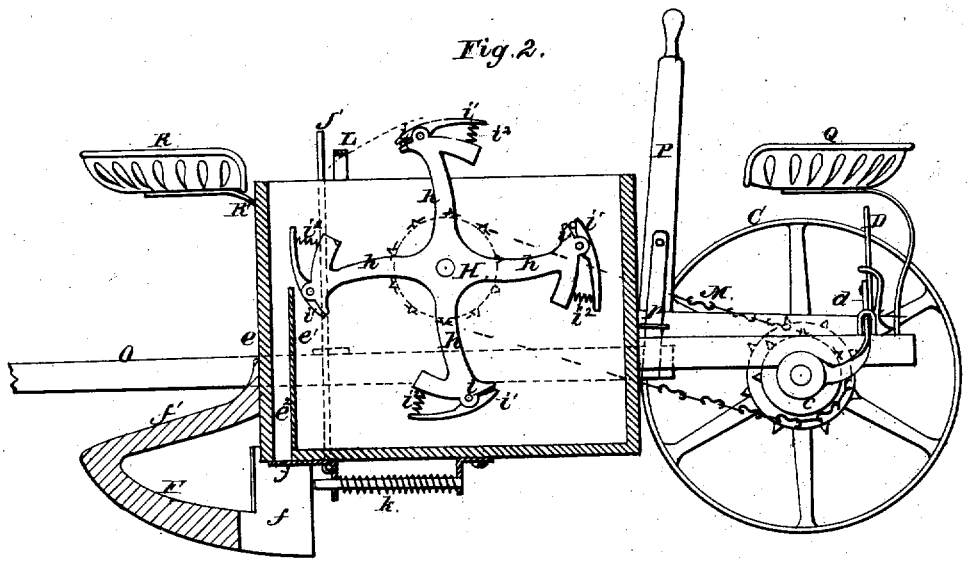

Figure 1 is a perspective view of my improved corn-planter, and Fig. 2 represents a longitudinal vertical section through the same. Similar letters of reference denote corresponding parts in both figures.

The invention relates to a novel means for grasping, picking up, and delivering the grains singly into the discharge-spout or outlet, from which they are discharged, in any desired number, into the hills or furrows; and consists, first, in the employment of a series of grasping jaws or bills rotating in the hopper, which, as they pass through the grain in the hopper, are adapted to grasp, pick up the grains, and to deliver them into the discharge-spout or outlet, as hereinafter explained; and, second, in certain details of construction and arrangement of parts of the machine, as hereinafter fully described.

In the accompanying drawing, A represents a main frame, made, by preference, rectangular in form, as shown, and mounted at or near its rear end upon an axle, B, which is supported by two independent carrying and driving wheels, C. These wheels are connected with the axle B by backing-ratchets *c*, held in mesh with ratchet-faces on the hubs of the wheels C by springs *c'*, and held out, when the machine is not in operation or for transportation from place to place, by means of a lever, D, and bent links *d*, forked, each at one end, to connect with the grooved collar of ratchet *c*, and connected at their inner ends with lever D, one on each side of its pivot, in such manner that both ratchets are moved in or out simultaneously.

The forward transverse bars *a a* of the main frame extend outward beyond the longitudinal bars, and have connected to them on each side, in front of and in line with the path of the wheels C C, grain boxes or hoppers E, made, by preference, rectangular in form, and extending some distance below the frame A, as shown. To the lower front corners or ends of these hoppers are connected runners F, forked and open at their rear or heel ends, with arms or flanges *f f* extending up, one on each side of, and bolted or otherwise firmly secured to, hopper E.

The runner F has also an arm or brace, *f'*, extending backward from its elevated point to and connected with the forward face of the hopper.

G is a transverse shaft, extending through the inner adjacent sides of the hoppers E, about midway of their length, and somewhat above midway of their depth. This shaft G has on each end, and within the hoppers, a spider or hub, H, provided with a series (two, three, four, or more) of radial arms, *h*, each of which is expanded at its end to form a stationary jaw, *i*, provided on its outer face, and forward of midway of its length, with perforated lugs or ears, in which is pivoted a corresponding lug or ear on a movable jaw, $i^1$, between the rear end of which and the rear end of the stationary jaw *i* is placed a slight spring, $i^2$, either leaf or spiral in form, for holding said jaws apart at their rear and together at their forward ends, as shown, the two jaws *i* $i^1$ forming a bill designed to pick up the corn or other grain in the hopper, as will be described.

Within the hopper, and near its forward end *e*, is a transverse partition-piece, $e^1$, extending from the bottom upward two-thirds (more or less, as may be preferred) the distance to the top, said partition-board $e^1$ forming the forward end of the grain-box, and also serving, in connection with the forward end *e* of the hopper, to form a down-spout, $e^2$, through which the grain is carried to and discharged upon the ground between the flanges *f f* of the runner F. *j j* are valves for closing the lower ends of these discharging-spouts, said valves being operated, for opening and permitting the discharge of the grain, by means of levers J, which, at their upper ends, are connected by a transverse bar, J', so that they may be operated simultaneously. Any suitable form of valve, such as the slide-valve shown, or the ordinary lever or swing valve, may be used. Said valves may be held closed, when not thrown open by the attendant, by means of a suitable spring, *k*.

L is a tripper arm or rod, arranged at the forward upper part of the hopper, as shown, and in such relation to the path of the rotating jaws or bills $i$ $i^1$ that the latter, while still moving forward, and after it has commenced its downward movement, passes under the rod L, causing the rear end of bill $i^1$ to come in contact with and to be depressed by said rod, for opening the jaws and permitting the discharge of the grain held thereby, and which, by the forward movement of the jaws, is thrown into the discharge-spout $e^2$.

The shaft G is armed, midway of its length, with a sprocket wheel or wheels, G′, to which motion is communicated by a chain or belt, M, from a corresponding wheel or pulleys on the main driving-axle B. A series or cone of these wheels may be employed for varying the speed of the shaft G, and thereby regulating the feed.

O is the tongue, pivoted to the forward transverse bar *a* of the main frame, for allowing the runners F to freely follow the surface of the ground, and provided with a rear extension or arm, O′, which, at its rear end, is connected, by a pivoted link, *p*, with a cam or eccentric lever, P, the lower or cam end of which, acting upon the longitudinal frame-bar *a*′, serves to raise the rear tongue extension against the frame, thereby depressing the forward end, making the tongue rigid, and raising the runners F off the ground for transportation. The heel or cam extension of the lever P is squared, and is also provided with a spur or pin for locking the lever with the parts raised for transportation, as represented in Fig. 2.

Q is the driver's seat, arranged at the rear end of the main frame, and in convenient position to enable the driver to operate the levers D and P.

R is a seat, connected with the upper end of a spring-standard, R′, by a vertical pivot, which permits it to be turned at any convenient angle for enabling the attendant sitting thereon to watch the action of the machine, and to operate the valve-levers J. This seat is, by preference, arranged at the forward end of the machine, with the driver in the rear of the lever-rod J′.

In operation, the jaws or bills $i$ $i^1$ are, by the rotation of their shaft, moved through the mass of corn or other grain in the hopper, and said mass, acting upon the rear extension of the movable jaw $i^1$, causes the jaw to be opened sufficiently to receive a grain of corn or other seed; and as the jaw rises out of the grain, the spring $i^2$, acting upon the movable jaw $i^1$, causes it to grasp and retain the seed until it is released by the action of the tripping-rod L upon the grasping-jaw $i^1$, causing it to be released and delivered into the discharging-spout $e^2$, as above explained.

The usefulness of these grasping-jaws can be readily seen by their grasping the grain and retaining it until carried to the proper place for delivery, thereby preventing it from being displaced by the violent motion of the machine while in use. These jaws may be made just wide enough to seize and retain a single grain of corn, or they may be expanded in width and made in spoon-bill form, adapting them to smaller grain; and in this latter construction they will readily take up and deliver any desired number of grains. By increasing the number of these bills, and dispensing with the valve in the bottom of discharging-spout $e^2$, the machine, without further change, may be made to satisfactorily perform the work of a grain-drill.

The valve *j* may be connected with the gearing, and so arranged as to be opened automatically after the passage of every third or fourth (more or less, as desired) of the bills $i$ $i^1$; but ordinarily I prefer to place them under the control of the attendant, as described, as the grain can then be deposited with precision at the desired point.

Having now described my invention, what I claim as new, and desire to secure by Letters Patent, is—

1. A stationary jaw and a movable jaw, forming a bill adapted to grasp and retain the seed by spring action, substantially as described, and for the purpose set forth.

2. The fixed jaw $i$ and pivoted jaw $i^1$, rotating within the hopper, and adapted to pick up the grain and deliver it to the discharge-spout or outlet, substantially as described.

3. The jaws $i$ $i^1$, rotating within the grain-box, as described, in combination with the tripper L, for operating the pivoted jaw $i^1$, as set forth.

4. The fixed jaw $i$ and pivoted jaw $i^1$, rotating within the hopper E, in combination with the tripper L and discharge-spout $e^2$, substantially as and for the purpose set forth.

This specification signed and witnessed this 13th day of July, 1877.

LYMAN J. CORBIN.

Witnesses:
JAMES FERGUSON,
A. O. BEHEL.